United States Patent
Casasola

(10) Patent No.: US 6,541,738 B1
(45) Date of Patent: Apr. 1, 2003

(54) PORTABLE FOOD CONTAINER WITH INCORPORATED HEATERS

(76) Inventor: Louis Casasola, 5160 Cranley Ave., Covina, CA (US) 91722

( * ) Notice: Subject to any disclaimer, the term of this patent is extended or adjusted under 35 U.S.C. 154(b) by 0 days.

(21) Appl. No.: 10/251,074

(22) Filed: Sep. 20, 2002

Related U.S. Application Data

(63) Continuation-in-part of application No. 09/933,435, filed on Aug. 20, 2001, now abandoned.

(51) Int. Cl.⁷ .............................. A47J 36/26; A47J 47/14
(52) U.S. Cl. ........................ 219/387; 219/413; 219/395; 219/398; 219/428
(58) Field of Search ............................. 219/387, 413, 219/432, 433, 395, 398, 428, 394

(56) References Cited

U.S. PATENT DOCUMENTS

| | | | | |
|---|---|---|---|---|
| 2,504,132 A | * | 4/1950 | Jones | 21/387 |
| 2,513,218 A | * | 6/1950 | Turnipseed | 219/387 |
| 3,385,952 A | * | 5/1968 | Mix | 219/387 |
| 3,482,078 A | * | 12/1969 | Milne | 219/387 |
| 3,808,401 A | * | 4/1974 | Wright et al. | 219/387 |
| 4,037,081 A | * | 7/1977 | Aldridge et al. | 219/387 |
| 4,543,471 A | * | 9/1985 | Anderson | 219/387 |
| 5,485,921 A | * | 1/1996 | Tolenado | 206/545 |
| 6,144,016 A | * | 11/2000 | Garvin | 219/387 |

* cited by examiner

Primary Examiner—Joseph Pelham
(74) Attorney, Agent, or Firm—Goldstein & Lavas, P.C.

(57) ABSTRACT

A portable food container with incorporated heaters including a container portion. The container portion includes a first cover member hingeably coupled with the back wall for covering the open upper end. The container portion includes a second cover member hingeably coupled with the back wall for covering the first cover member and the open upper end. The second cover member contains a thermos bottle therein. A pair of heating elements are disposed within the closed lower end of the container portion. Three insulated receptacles are removably positioned within the container portion including two hot food receptacles and one cold food receptacle. The hot food receptacles are each in contact with one of the heating elements. A control panel allows independent control of a duration and activation time of day for heating by each of the heating elements.

6 Claims, 4 Drawing Sheets

PORTABLE FOOD CONTAINER WITH INCORPORATED HEATERS

CROSS REFERENCES AND RELATED SUBJECT MATTER

This application is a continuation-in-part of patent application Ser. No. 09/933,435, filed in the United States Patent Office on Aug. 20, 2001 now abandoned.

BACKGROUND OF THE INVENTION

The present invention relates to a portable food container with incorporated heaters and more particularly pertains to a device which has several compartments for containing food, which allows foods to be independently heated prior to consumption.

The use of portable food containers is known in the prior art. More specifically, portable food containers heretofore devised and utilized for the purpose of holding food items for eating at a remote location are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,630,671 to Sherman discloses a lunch box capable of holding freezable liquid for cooling and an electrically powered heating element for warming and includes a temperature control device. U.S. Pat. No. 5,065,867 to Alfredson and U.S. Pat. No. 5,485,921 to Tolendano disclose lunch boxes capable of maintaining separate food items as different temperatures.

U.S. Pat. No. 3,808,301 to Wright et al. And U.S. Pat. No. 4,037,081 to Aldridge et al. both disclose electrically heated lunch containers. However, Aldridge does not allow a user to selectively control the heating its individual compartments. In addition, neither Wright et al. nor Aldridge disclose any way to automatically control the heating time.

U.S. Pat. No. 3,385,952 to Mix appears to disclose an electrically heated lunch kit, which employs a timer to control the heating cycle of the contents. However, there is no provision to activate the heating at a predetermined time so that the food will be heated at "lunch time".

While these devices fulfill their respective, particular objective and requirements, the aforementioned patents do not describe a portable food container with an incorporated heater for allowing foods to be heated prior to consumption.

In this respect, the portable food container with incorporated heater according to the present invention substantially departs from the conventional concepts and designs of the prior art, and in doing so provides an apparatus primarily developed for the purpose of allowing foods to be heated prior to consumption.

Therefore, it can be appreciated that there exists a continuing need for a new and improved portable food container with an incorporated heater which can be used for allowing foods to be heated prior to consumption. In this regard, the present invention substantially fulfills this need.

SUMMARY OF THE INVENTION

In the view of the foregoing disadvantages inherent in the known types of portable food containers now present in the prior art, the present invention provides an improved portable food container with incorporated heaters. As such, the general purpose of the present invention, which will be described subsequently in greater detail, is to provide a new and improved portable food container with an incorporated heater which has all the advantages of the prior art and none of the disadvantages.

It is a primary object of the invention to provide a portable food container which provides at least two heating compartments, and allows the heating of those compartments to be controlled, both in heating intensity and activation time of day.

To attain this, the present invention essentially comprises a container portion having a generally rectangular configuration. The container portion has an open upper end, a closed lower end, a front wall, a back wall, and opposed side walls. The container portion includes a first cover member hingeably coupled with the back wall for covering the open upper end. The first cover member is insulated. The container portion includes a second cover member hingeably coupled with the back wall for covering the first cover member and the open upper end. The second cover member has a generally semi-cylindrical cross-section for containing a thermos bottle therein. The second cover member and the front wall have corresponding latches to lock the second cover member over the open upper end. The second cover member has a handle extending upwardly therefrom. At least two heating elements are disposed within the closed lower end of the container portion. The heating elements have connectors for coupling with power sources. The connectors include a standard electrical outlet connector and a vehicle cigarette light connector. Three insulated receptacles are removably positioned within the container portion. Two of the receptacles are hot food receptacles and one of the receptacles is a cold food receptacle. The hot food receptacles are each in contact with one of the heating elements. A control panel is disposed within one of the opposed side walls of the container portion. The control panel is in communication with the heating element for controlling an activation time and duration of heat generated by each heating element.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable food container with incorporated heaters that has all the advantages of the prior art portable food containers and none of the disadvantages.

It is another object of the present invention to provide a new and improved portable food container with incorporated heaters that may be easily and efficiently manufactured and marketed.

It is a further object of the present invention to provide a new and improved portable food container with incorporated heaters that is of durable and reliable construction.

An even further object of the present invention is to provide a new and improved portable food container with incorporated heaters which is susceptible to a low cost of manufacture with regard to both materials and labor, and which accordingly is then susceptible to low prices of sale to the consuming public, thereby making such a portable food container with incorporated heaters economically available to the buying public.

Even still another object of the present invention is to provide a new and improved portable food container with incorporated heaters for allowing foods to be automatically heated prior to the time of anticipated consumption.

Lastly, it is an object of the present invention to provide a new and improved portable food container with incorporated heaters including a container portion having an open upper end, a closed lower end, a front wall, a back wall, and opposed side walls. The container portion includes a first cover member hingeably coupled with the back wall for covering the open upper end. The first cover member is insulated. The container portion includes a second cover member hingeably coupled with the back wall for covering the first cover member and the open upper end. The second cover member contains a thermos bottle therein. At least two heating elements are disposed within the closed lower end of the container portion. The heating elements have connectors for coupling with power sources. Three insulated receptacles are removably positioned within the container portion. Two of the receptacles are hot food receptacles and one of the receptacles is a cold food receptacle. The hot food receptacles are in contact with the heating element. A control panel is disposed within one of the opposed side walls of the container portion. The control panel is in communication with the heating elements for controlling the activation and duration of heat generated by the heating element.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
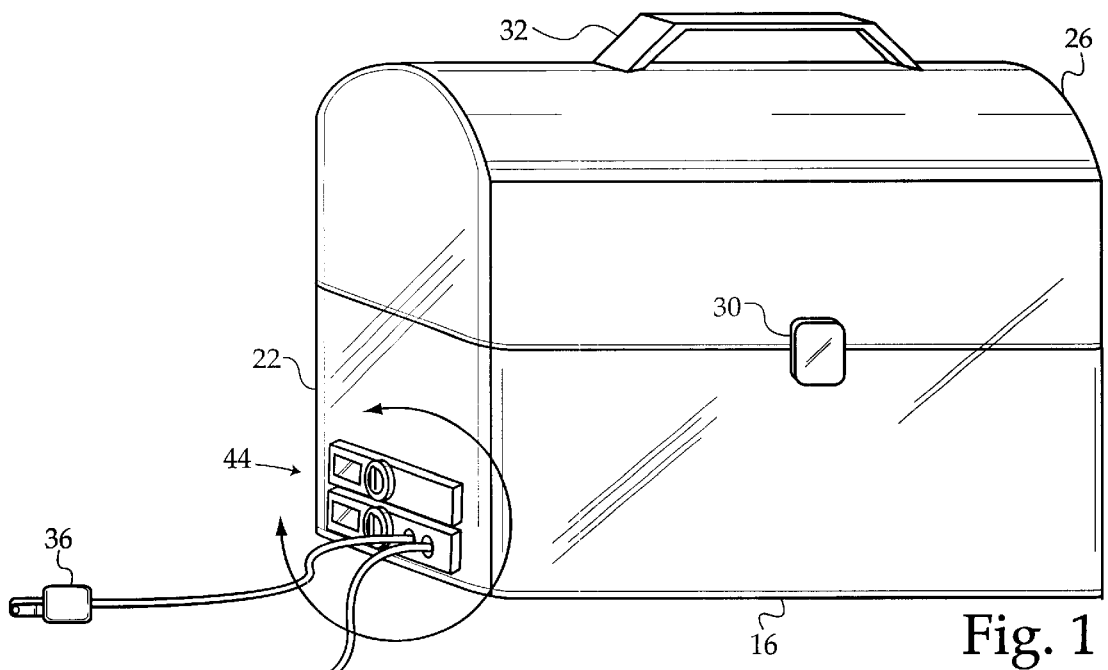
FIG. 1 is a perspective view of the preferred embodiment of the portable food container with incorporated heaters constructed in accordance with the principles of the present invention.
Figure 2:
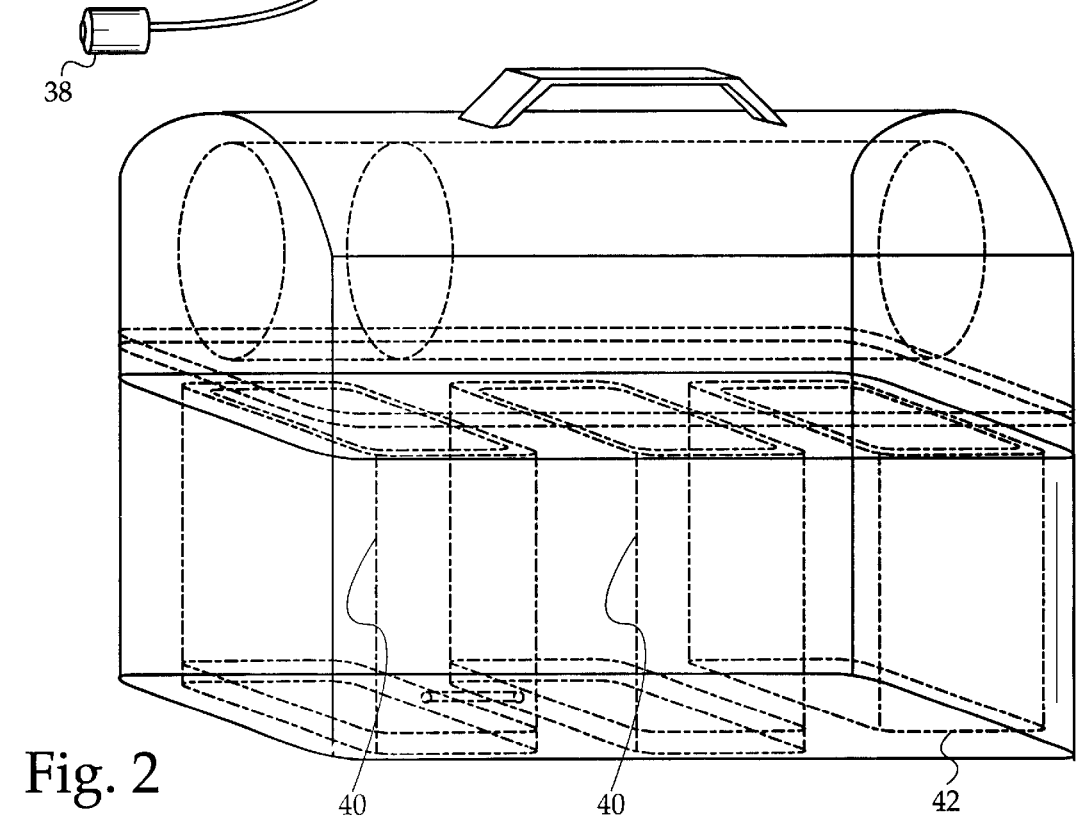
FIG. 2 is a perspective view of the present invention illustrating an interior of the container portion.
Figure 3:
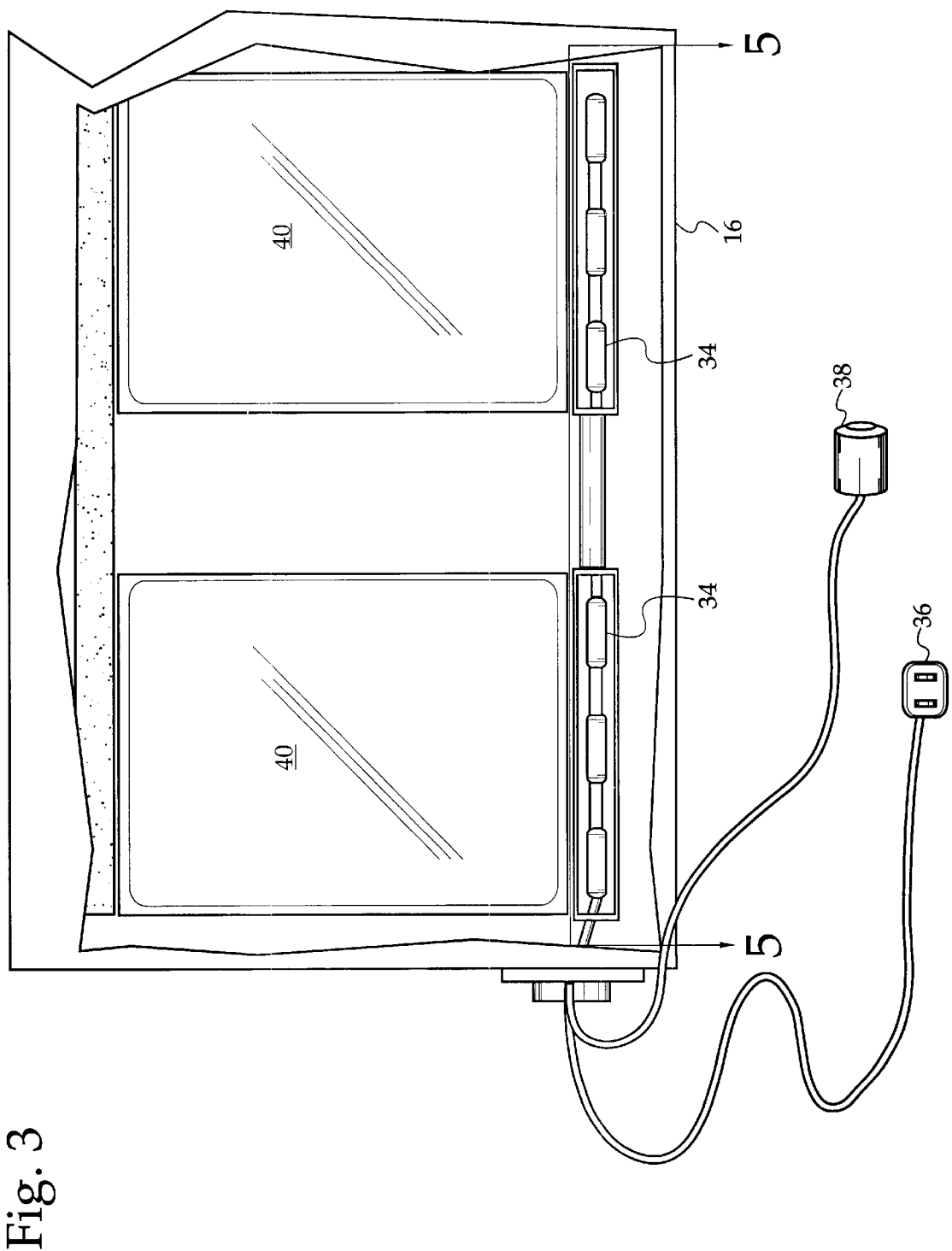
FIG. 3 is a side view of the present invention illustrating the heating elements thereof.
Figure 4:
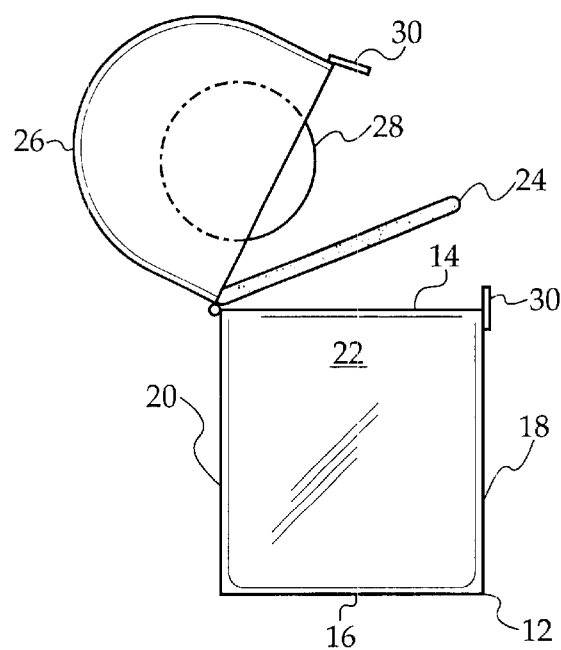
FIG. 4 is an elevated end view of the present invention.
Figure 5:
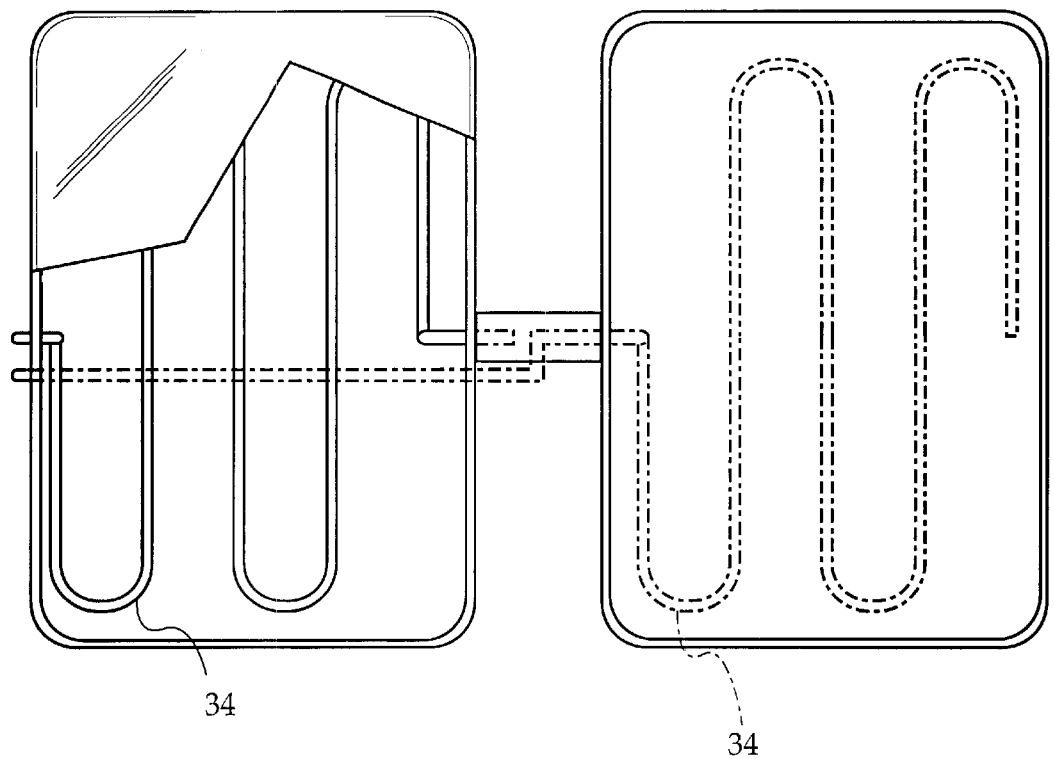
FIG. 5 is a top plan view of the heating elements of the present invention.
Figure 6:
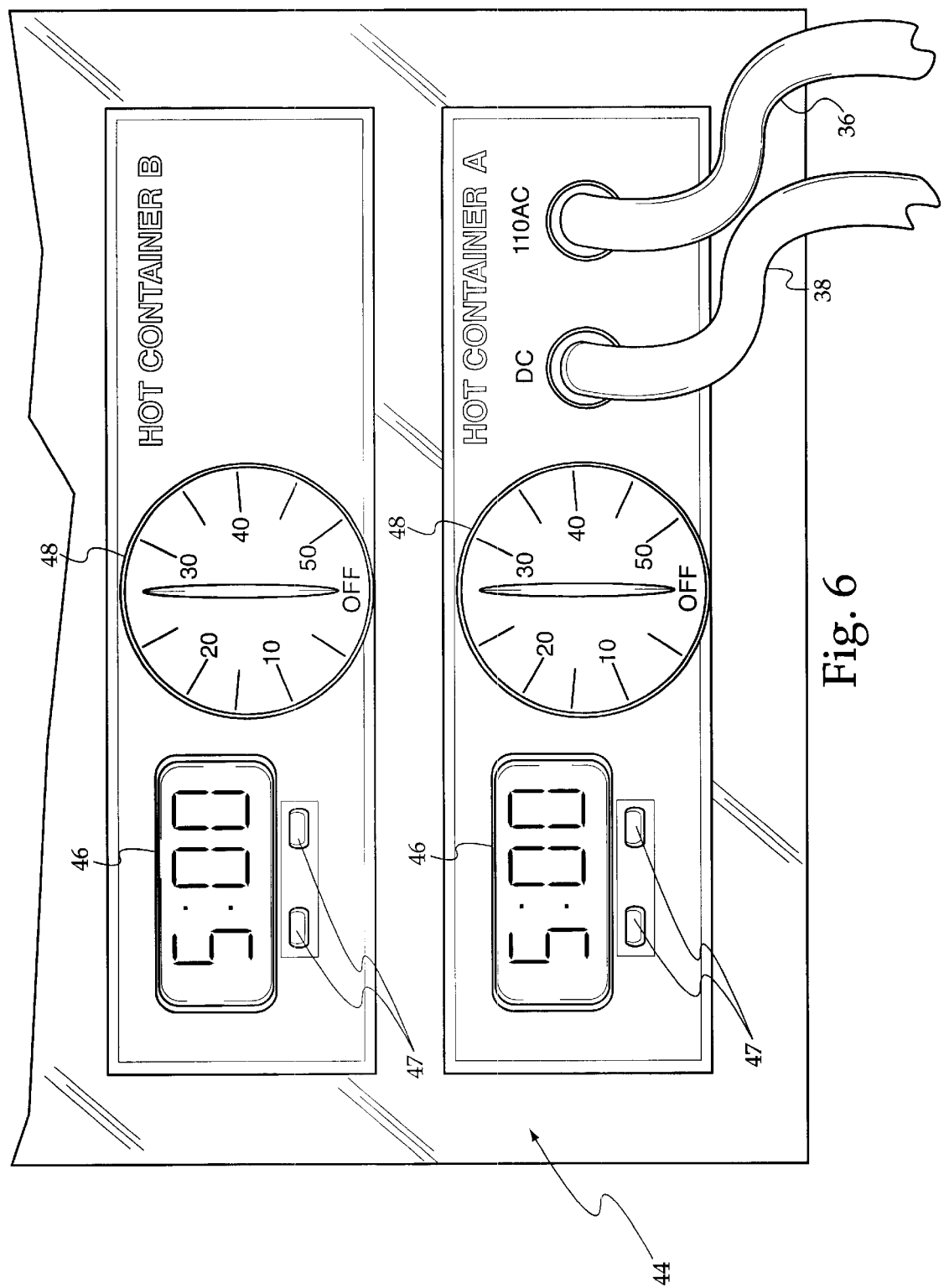
FIG. 6 is a front view of the control panel of the present invention.

With reference now to the drawings, and in particular, to FIGS. 1 through 6 thereof, the preferred embodiment of the new and improved portable food container with incorporated heaters embodying the principles and concepts of the present invention and generally designated by the reference number 10 will be described.

Specifically, it will be noted in the various Figures that the device relates to a portable food container with incorporated heaters for allowing foods to be individually heated prior to a time of anticipated consumption. In its broadest context, the device consists of a container portion, at least two heating elements, three insulated receptacles, and a control panel. Such components are individually configured and correlated with respect to each other so as to attain the desired objective.

The container portion 12 has a generally rectangular configuration. The container portion 12 has an open upper end 14, a closed lower end 16, a front wall 18, a back wall 20, and opposed side walls 22. The container portion 12 includes a first cover member 24 hingeably coupled with the back wall 20 for covering the open upper end 14. The first cover member 24 is insulated. The container portion 12 includes a second cover member 26 hingeably coupled with the back wall 20 for covering the first cover member 24 and the open upper end 14. The second cover member 26 has a generally semi-cylindrical cross-section for containing a thermos bottle 28 therein. The second cover member 26 and the front wall 18 have corresponding latches 30 to lock the second cover member 26 over the open upper end 14. The second cover member 26 has a handle 32 extending upwardly therefrom.

The heating elements 34 are disposed within the closed lower end 16 of the container portion 12. The heating elements have a generally serpentine configuration to provide an even disbursement of heat. The container has connectors for coupling the heating elements 34 with power sources. The connectors include a standard electrical outlet connector 36 and a vehicle cigarette light connector 38. This provides flexibility in powering the heating elements 34, and thereby allowing the container 10 to be activated and used at different locations.

The three insulated receptacles are removably positioned within the container portion 12. Two of the receptacles are hot food receptacles 40 and one of the receptacles is a cold food receptacle 42. The hot food receptacles 40 are in contact with the heating elements 34. In particular, one of the heating elements is uniquely associated with each one of the hot food receptacles 40. Accordingly, the heating elements 34 are wired to be separately activated by the control panel 44 so as to independently heat the two hot food receptacles 40 as desired. The receptacles 40,42 can all be easily removed from the container portion 12 and serve as bowls for a person to eat directly from. The cold food receptacle 42 can also be used to store items such as utensils and napkins that should not be exposed to heat.

The control panel 44 is disposed within one of the opposed side walls 22 of the container portion 12. The control panel 44 is in communication with the heating elements 34 for controlling at least the duration of heat generated by the heating element 34, and an activation time of day for each heating element 34. In particular, the control panel 44 includes a pair of activation alarms 46, each which may be set by time setting buttons 47. The control panel 44 allows the length of time the heating element 34 is activated. A pair of duration timer 48 are provided to each control the duration of heating for one of the heating elements 34. Accordingly, the user can set the duration timer 48 for each heating element according to the desired heating time for food contained within each of the two hot receptacles 40. Then, the user can subtract the heating time for each receptacle from the anticipated time of day for the food consumption and set the activation alarm at that time. Accordingly, if lunch time is 12:00 PM, one food requires twenty minutes of heating and the other fifteen minutes, then one of the duration timers 48 is set to twenty minutes, the other duration timer is set to fifteen minutes, one of the activation alarms 46 is set to 11:40 AM, and the other activation alarm 46 is set to 11:45 AM. Accordingly, the foods in both hot receptacles 40 will be heated as necessary, and ready at the time of consumption: 12:00 PM.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A portable food container with an incorporated heater for allowing foods to be heated prior to consumption comprising, in combination:

a container portion having a generally rectangular configuration, the container portion having an open upper end, a closed lower end, a front wall, a back wall, and opposed side walls, the container portion including a first cover member hingeably coupled with the back wall for covering the open upper end, the first cover member being insulated, the container portion including a second cover member hingeably coupled with the back wall for covering the first cover member and the open upper end, the second cover member having a generally semi-cylindrical cross-section for containing a thermos bottle therein, the second cover member and the front wall having corresponding latches to lock the second cover member over the open upper end, the second cover member having a handle extending upwardly therefrom;

a pair of heating elements disposed within the closed lower end of the container portion, the heating elements are individually operable, the heating element having connectors for coupling with power sources, the connectors including a standard electrical outlet connector and a vehicle cigarette light connector;

three insulated receptacles removably positioned within the container portion, two of the receptacles being hot food receptacles and one of the receptacles being a cold food receptacle, each of the hot food receptacles being uniquely in contact with one of the heating element; and a control panel disposed within one of the opposed side walls of the container portion, the control panel having a pair of duration timers and a pair of activation alarms, each of the heating elements is uniquely controlled by one of the duration timers and one of the activation alarms, such that the duration timers and activation alarms allow a heating duration and a heating activation time of day to be separately controlled for each of the heating elements.

2. A portable food container with an incorporated heater for allowing foods to be heated prior to consumption comprising, in combination:

a container portion having an open upper end, a closed lower end, a front wall, a back wall, and opposed side walls, the container portion including a first cover member hingeably coupled with the back wall for covering the open upper end, the first cover member being insulated, the container portion including a second cover member hingeably coupled with the back wall for covering the first cover member and the open upper end, the second cover member containing a thermos bottle therein;

a pair of heating elements disposed within the closed lower end of the container portion, the heating element having connectors for coupling with power sources, each heating element being independently operable;

three insulated receptacles removably positioned within the container portion, two of the receptacles being hot food receptacles and one of the receptacles being a cold food receptacle, the hot food receptacles each in contact with one of the heating elements; and a control panel disposed within one of the walls of the container portion, the control panel being in communication with the heating elements for independently controlling an activation time of day and a heating duration for each of the heating elements.

3. The portable food container with an incorporated heater as set forth in claim 2, wherein the second cover member and the front wall of the container portion have corresponding latches to lock the second cover member over the open upper end.

4. The portable food container with an incorporated heater as set forth in claim 2, wherein the second cover member has a handle extending upwardly therefrom.

5. The portable food container with an incorporated heater as set forth in claim 2, wherein the connectors of the heating element include a standard electrical outlet connector and a vehicle cigarette light connector.

6. The portable food container with an incorporated heater as set forth in claim 2, wherein the control panel includes a duration timer and an activation alarm.

* * * * *